US009998871B1

(12) United States Patent
Bontempo

(10) Patent No.: US 9,998,871 B1
(45) Date of Patent: Jun. 12, 2018

(54) SYSTEM AND METHOD FOR TRANSMITTING OR DELAYING THE DELIVERY OF AN ELECTRONIC MESSAGE BASED ON LOCATION

(71) Applicant: Daniel Bontempo, Fairview Village, PA (US)

(72) Inventor: Daniel Bontempo, Fairview Village, PA (US)

( * ) Notice: Subject to any disclaimer, the term of this patent is extended or adjusted under 35 U.S.C. 154(b) by 0 days. days.

(21) Appl. No.: 15/640,619

(22) Filed: Jul. 3, 2017

Related U.S. Application Data

(63) Continuation-in-part of application No. 15/630,999, filed on Jun. 23, 2017.

(51) Int. Cl.
*H04W 8/08* (2009.01)
*H04W 4/02* (2018.01)
*H04L 12/58* (2006.01)
*H04W 4/14* (2009.01)

(52) U.S. Cl.
CPC ............ *H04W 4/023* (2013.01); *H04L 51/36* (2013.01); *H04L 51/38* (2013.01); *H04W 4/021* (2013.01); *H04W 4/14* (2013.01)

(58) Field of Classification Search
CPC ..... H04W 4/043; H04W 24/10; H04W 4/023; H04W 4/026; H04W 4/027; H04W 84/18; H04L 43/0864; H04L 5/0055; G01S 5/0289

USPC ........................ 455/456.1, 456.5, 519, 456.3
See application file for complete search history.

(56) References Cited

U.S. PATENT DOCUMENTS

| 9,049,555 | B2 | 6/2015 | Wang et al. |
|---|---|---|---|
| 9,537,966 | B2 | 1/2017 | Liu |
| 2006/0128398 | A1 | 6/2006 | Chin et al. |
| 2011/0161427 | A1 | 6/2011 | Fortin et al. |
| 2012/0284769 | A1 | 11/2012 | Dixon et al. |
| 2014/0141795 | A1 | 5/2014 | Abraham et al. |
| 2014/0162692 | A1* | 6/2014 | Li ........................... H04L 67/40 455/456.3 |
| 2014/0196106 | A1 | 7/2014 | Zellner |
| 2015/0031398 | A1 | 1/2015 | Rahnama |
| 2016/0171545 | A1 | 6/2016 | Cheung |
| 2017/0034083 | A1 | 2/2017 | Deutsch |
| 2017/0034656 | A1 | 2/2017 | Wang et al. |

OTHER PUBLICATIONS

AT&T, "Living the Networked Life". Printed Feb. 6, 2017. 2 pages.
Hieggelke, Brent. "How to Do Location-Based Push Marketing Without Going Too Far", Jul. 16, 2014. 10 pages.

* cited by examiner

*Primary Examiner* — Phuoc H Doan
(74) *Attorney, Agent, or Firm* — Joseph E. Maenner; Maenner & Associates, LLC

(57) ABSTRACT

In described embodiments, a method of managing mobile device data based on location is provided. The method includes defining a geofence within which a mobile device can receive electronic data and outside of which the mobile device cannot receive the electronic data.

13 Claims, 6 Drawing Sheets

SYSTEM AND METHOD FOR TRANSMITTING OR DELAYING THE DELIVERY OF AN ELECTRONIC MESSAGE BASED ON LOCATION

BACKGROUND OF THE INVENTION

Field of the Invention

The present invention relates to transmitting or delaying the delivery of an electronic message based on the location of the receiving party.

Description of the Related Art

Wireless communication systems provide for the instantaneous and constant ability to be able to communicate. There are times and locations, however, when it may be desired or required to provide for reception of electronic signals and messages only when an electronic device and the person carrying the device are within a specific area such as, for example, in a school or a place of employment.

It would be beneficial to provide a system and a method for providing the reception of electronic signals and data only when an electronic device is within a defined boundary.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, the present invention is a method for transmitting data. The method comprises the steps of providing a first reception location; transmitting electronic data from a server to an electronic device; accepting the electronic data only if the electronic device is in a first position relative to the first reception location; and deferring acceptance of the electronic data only if the electronic device is in a second position relative to the first reception location.

In another embodiment, the method comprises the steps of providing a first reception location; determining a location of an electronic device; transmitting electronic information about the location of the electronic device from the electronic device to a server; transmitting electronic data from the server to the electronic device only when the previous step indicates that the electronic device is in a first position relative to the first reception location; and deferring transmitting the electronic data from the server to the electronic device only when that step indicates that the electronic device is in a second position relative to the first reception location.

In another embodiment, the method comprises the steps of providing a first reception location; transmitting metadata from a server to an electronic device; determining a location of the electronic device; transmitting electronic information about the location of the electronic device from the electronic device to the server; transmitting data from the server to the electronic device only when the previous step indicates that the electronic device is in a first position relative to the first reception location; and deferring transmitting the electronic data from the server to the electronic device only when that step indicates that the electronic device is in a second position relative to the first reception location.

BRIEF DESCRIPTION OF THE DRAWINGS

The accompanying drawings, which is incorporated herein and constitutes part of this specification, illustrate presently preferred embodiments of the invention, and, together with the general description given above and the detailed description given below, serve to explain the features of the invention. In the drawings.

DETAILED DESCRIPTION

Figure 1:
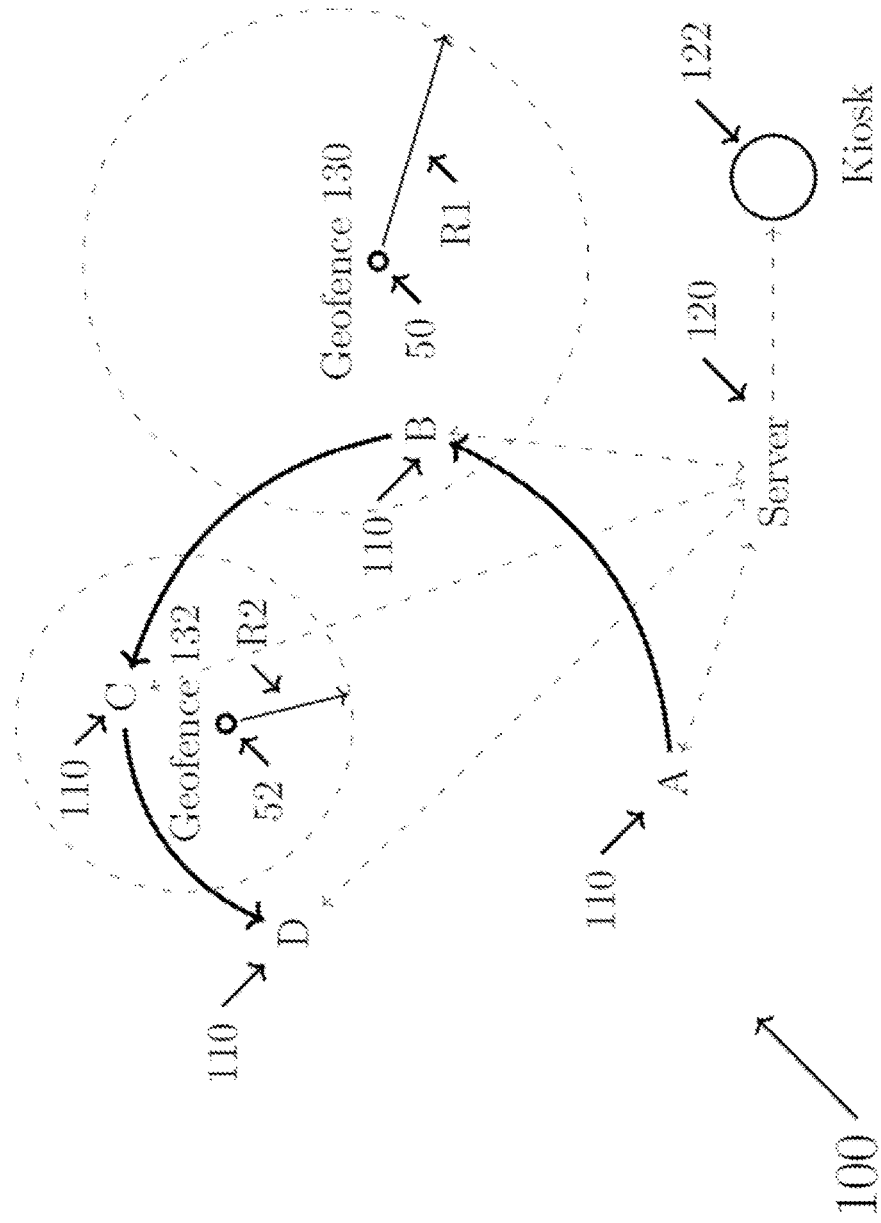
FIG. 1 is an exemplary schematic drawing of a system used to transmit or delay the delivery of an electronic message.
Figure 2A:
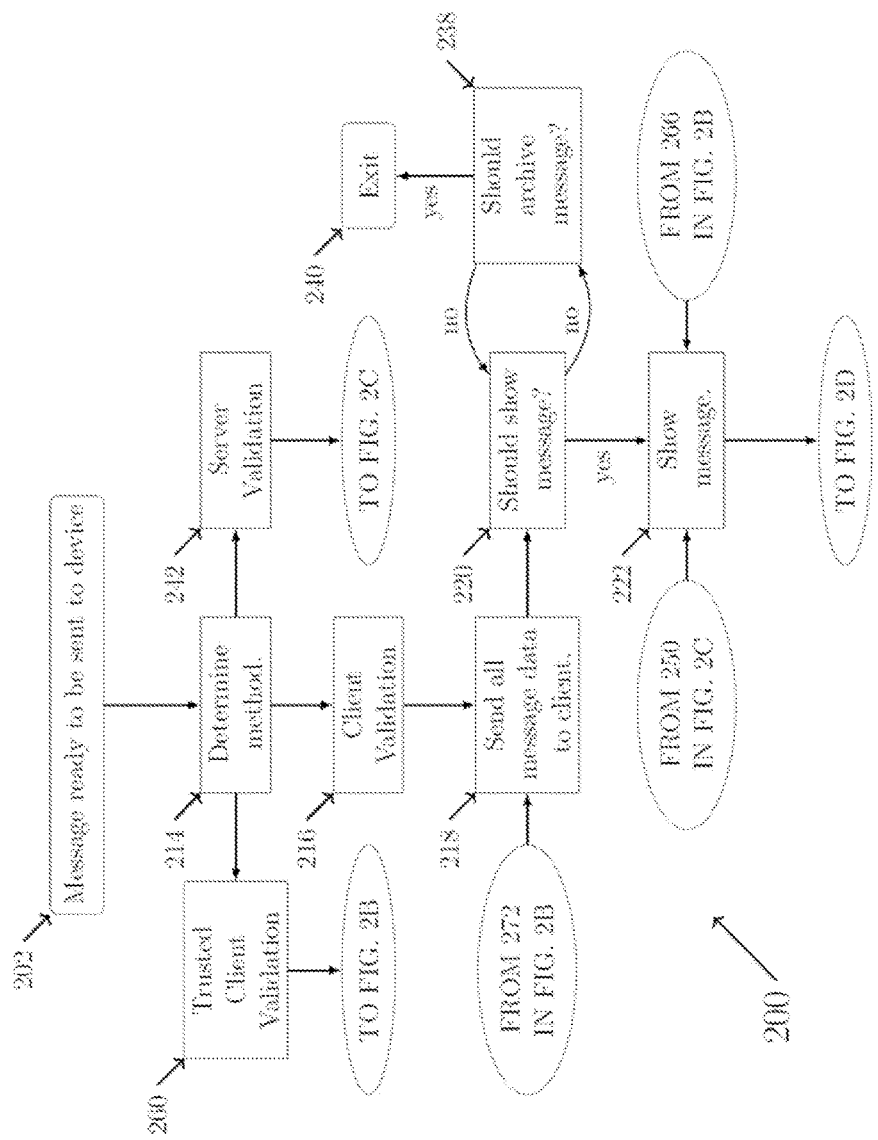
FIGS. 2A-2D is a flowchart showing an exemplary operation of the system used in FIG. 1.
Figure 2B:
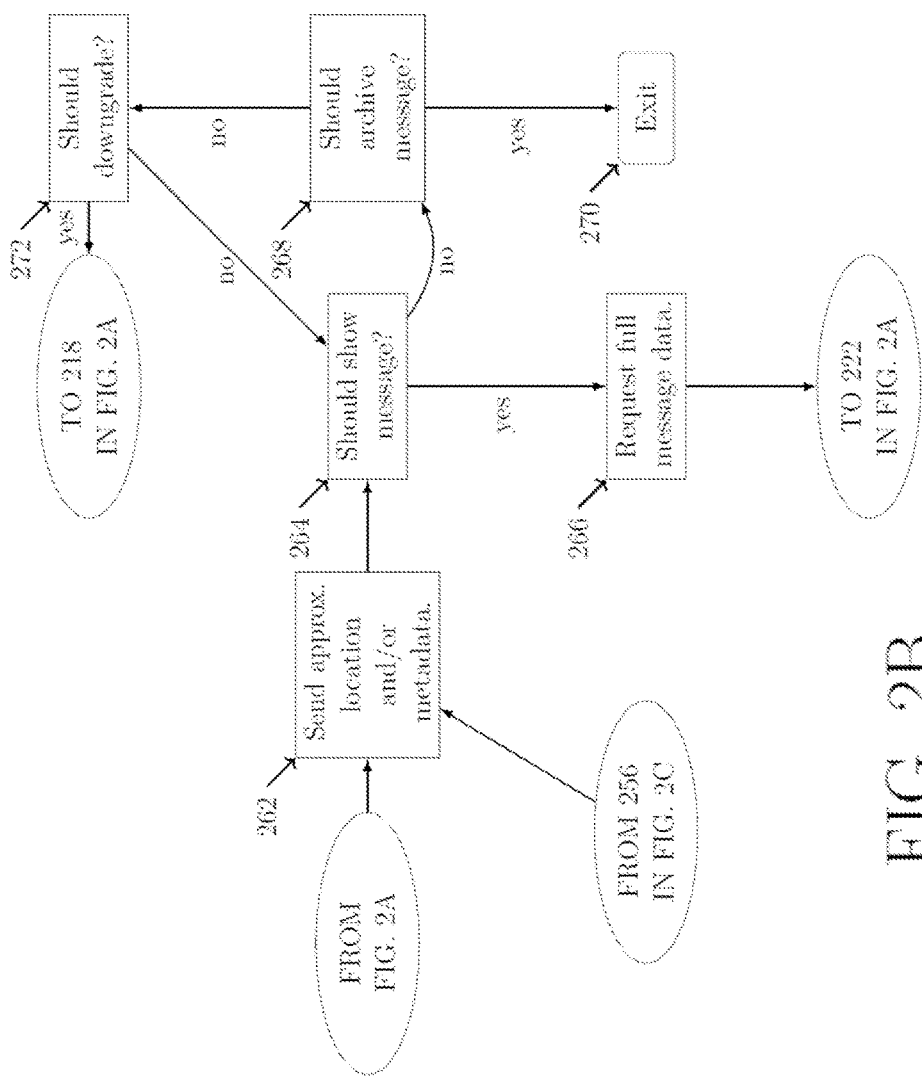
Figure 2C:
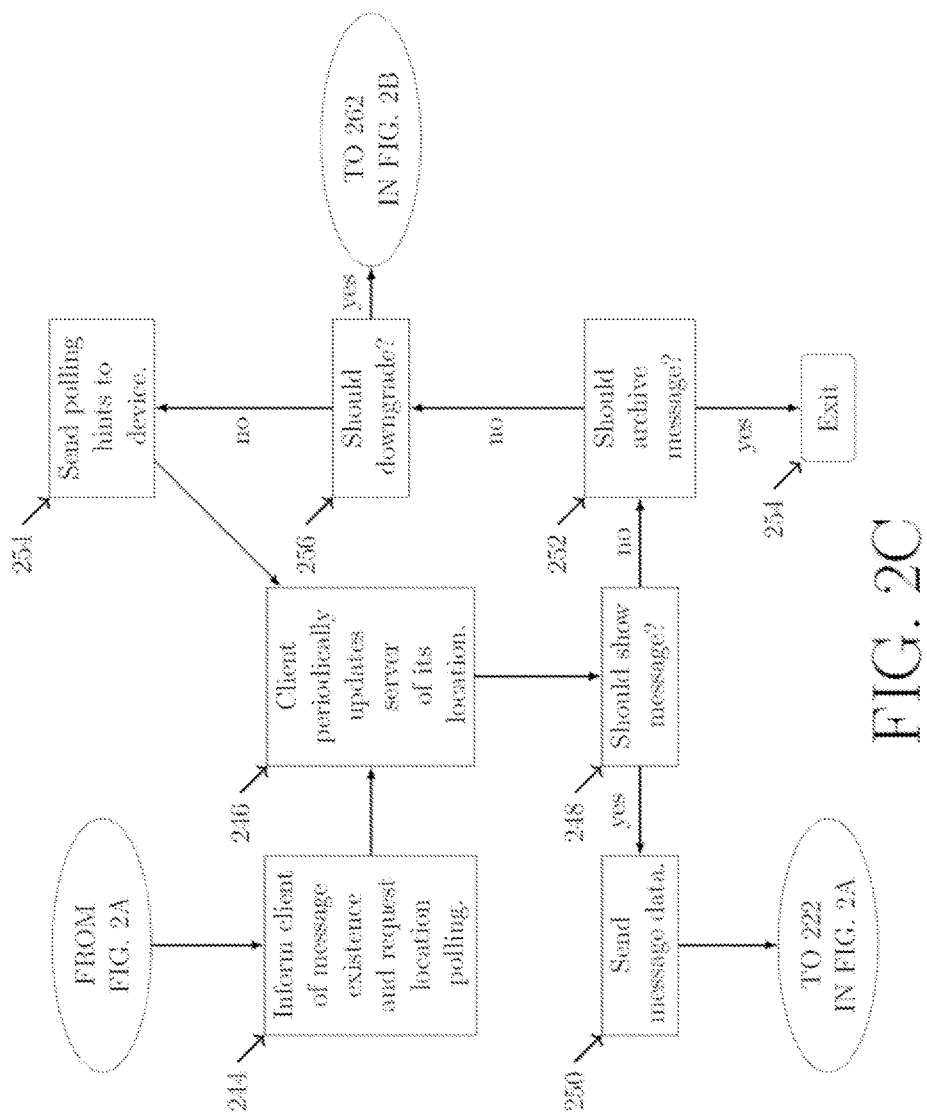
Figure 2D:
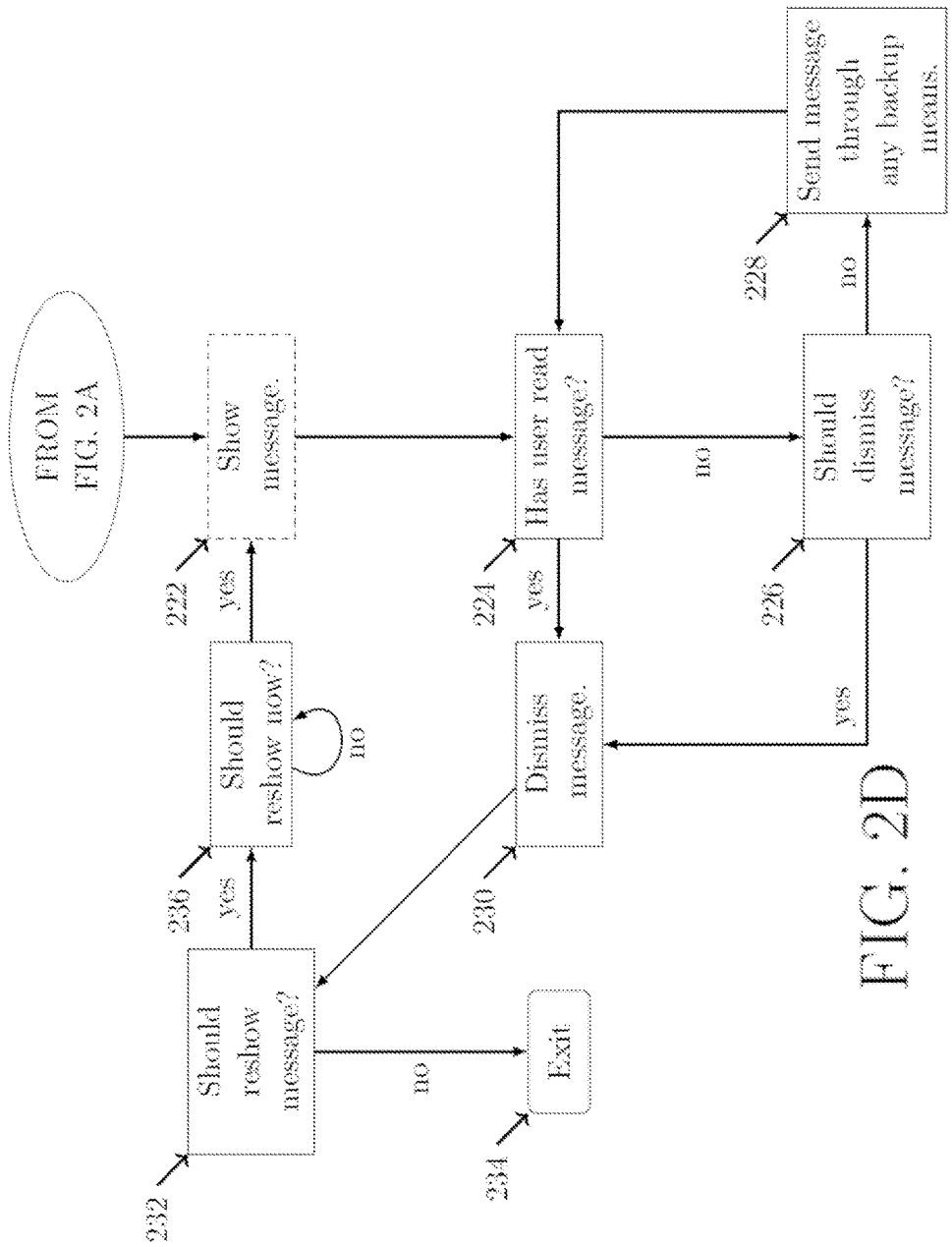
Figure 3:
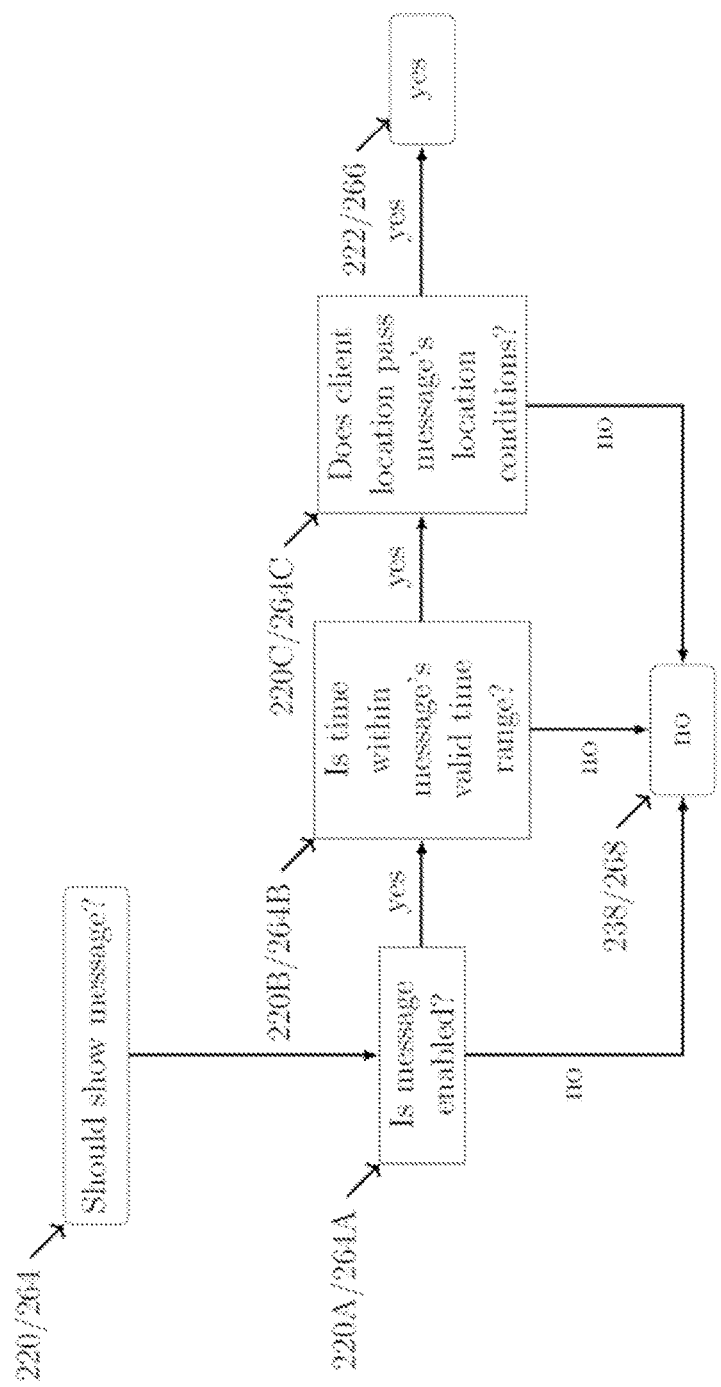
FIG. 3 is a flowchart showing exemplary logic used to determine whether to show a message.

In the drawing, like numerals indicate like elements throughout. Certain terminology is used herein for convenience only and is not to be taken as a limitation on the present invention. The terminology includes the words specifically mentioned, derivatives thereof and words of similar import. As used herein, an "electronic device" can be any type of mobile electronic device, such as a cell phone, an iPad, and iPod, or other similar mobile, hand-held, or portable device capable of receiving electronic information. "Electronic information" can be an e-mail, a text message, a phone call, voice mail, SMS, MMS, or any other form of wireless communication. A "server" can be fixed device, such as a cell phone tower, a computer, or other device capable of receiving and transmitting electronic data. Alternatively, the server can be mobile.

The embodiments illustrated below are not intended to be exhaustive or to limit the invention to the precise form disclosed. These embodiments are chosen and described to best explain the principle of the invention and its application and practical use and to enable others skilled in the art to best utilize the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

The invention is an electronic data transmission system that can be utilized by a group that may include, but is not limited to, schools, universities, hospitals, corporations, organizations, institutions, commercial establishments, whereby the system limits the transmission of data based on geographic proximity of the receiving device to the group setting as determined by system administrators and locations of receiving devices.

The system is a two component system comprising a group issued application ("app") and an Application Program Interface ("API") that the app interfaces with. The system is effected by issuance of a group specific app to group members for installation on their portable electronic devices, such as cell phones. The app enables group administrators and/or group members to send and/or receive whole group, subgroup, or individual group member electronic data transmissions to one another, the receipt of which is only available when the electronic devices are within defined geofenced area(s). Alternatively, the system can be set up so that the electronic data transmissions can be withheld while electronic devices are within defined geofenced area(s)

Data transmissions sent via the communications system will be conducted through the API or framework to delay transmission to the receiving electronic device until the device enters or leaves the geofenced location.

The manipulation of data can be based on location, time, and/or other requirements or any combination thereof. This manipulation can include, but is not limited to, deferring, cancelling, withholding, transferring, or receiving the data. The data being manipulated can include, but is not limited to, audio, text, pictures, other content, or any combination or multiplicity thereof. Additionally, this data may be sent through any number of platforms or services. These platforms and services may include, but are not limited to, email, SMS, MMS, voice mail, any other external service, or any combination thereof. Location reliant functionality can be based on, but is not limited to, geolocation, geofencing, other location services, or any combination or multiplicity thereof. This concept of data manipulation can be employed in forms including, but not limited to, a mobile app, a computer application, program extension, or any other piece of software or embedded system on any platform. The purposes for employing the geographic specific communications system include, but are not limited to timing of notification, courtesy, privacy and security.

Referring to the Figure, a system and method for delivering or delaying the delivery of an electronic message depending on the location of a receiving electronic device relative to a predefined location (or "geofence") is provided. The method manages mobile device data based on location. Typically a phone or other electronic device 110 receives pushed data from a server 120 and operates on that data immediately, displaying a notification or otherwise.

Electronic device 110 communicates periodically with server 120. Communications can be initiated by device 110 (e.g. HTTP request, etc.) or server 120 (e.g. push, Google Cloud Messaging, etc.). An app installed on electronic device 110 communicates with an API resident on server 120 to perform the methods disclosed in the exemplary embodiments. In an exemplary embodiment, the system can be a closed system that can be employed at a school or other educational institution, a workplace, or other environment where a group of people congregate to transmit wireless electronic messages (e.g., voice, text, etc.) only when electronic devices 110 are inside the school or within a close proximity to the physical school building. The server 120 can be located inside the environment. While the following examples are directed to using the inventive system and method in a school, those skilled in the art will recognize that the inventive system and method can be used for other locations as well.

Exemplary electronic messages can be transmitted to an individual student, such as to remind the student of an appointment with a teacher or school administrator; a group of students, such as to remind the band members that the day's practice time has been changed; to the entire student body, such as to remind the students to attend Friday night's football game; to the faculty, such as to inform them of the location for that day's faculty meeting; or any other group associated with the school.

Optionally, for people in the group who, for whatever reason, do not have device 110 with them, one or more kiosks 122 can be present at the school so that a member of the group can periodically check the kiosk 122 for messages. The group member can access his/her messages by inputting a code, such as student I.D. number and a password. Additionally, or alternatively, an email can be sent to group member so that, if they do not have their electronic device 110, an email will also be sent that will enable the group member to access the message by opening their email.

The inventive method forwards, delays, defers, or cancels notifications and other data sent from server 120 based on the location of electronic device 110. For group members who may not be at the location when a message is transmitted, an administrator override is provided to push the message to those group members by other means. By way of example only, for students who are absent due to sickness or travel, all of the names on that day's "Absent" list, receive the push so that their electronic device 110 receives the message regardless of its location.

If a group member's device 110 is "off" when the message is transmitted by server 120, when device 110 is turned back on and device 110 is within the geofence, device 110 transmits a message to server 120 to inform server 120 that device 110 is now "on", and server 120 then re-transmits all messages that were transmitted while device 110 was "off".

If a group member is not within the school at the time that a message is transmitted, serer 120 can periodically attempt to push the message that person's device 110 until the message is received. For example, if a student is on a distant part of campus and outside of the geofence, when that device 110 re-enters the geofence, the message will be received by device 110 the next time that the server 120 pushes the message to that device 110.

Messages transmitted by server 120 to electronic devices 110 can be temporal as well and server will cease pushing a message to devices 110 that have not acknowledged receipt of the message after a predetermined time. For example, if the message is to a particular student reminding the student of a 10:00 appointment, the message will stop being sent upon acknowledgement of receipt by that student's device 110 back to server 120 or, by way of example only, 30 minutes after the appointment time. For informational messages to a group, such as to a student body reminding them of Friday night's football game, reminders can be stopped at the conclusion of the school day on Friday afternoon, when students are leaving the geofence.

Examples above are provided for the reception of electronic messages when electronic device 110 is within the geofence. Situations may exist in which it is desired to defer reception of electronic messages when electronic device 110 is within the geofence, such as, for example, to prevent students from texting each other during class, to enable a student to access outside information during a test, or other situations. To provide such a feature, it may be required that electronic device 110 "opt into" this feature by transmitting an electronic permission to server 120 informing server 120 that this particular electronic device 110 has "opted in" to the feature, thereby enabling server 120 to defer the transmission of messages to device 110 while device 110 is within the geofence.

FIG. 1 provides a schematic of a first exemplary method of device validation of using system 100. Geofences 130, 132 are electronically generated. Geofences 130, 132 can be generated by several methods such as, by way of example only, extending a radius R1, R2, respectively, outwardly from a fixed point 50, 52, such as a GPS position. Alternatively, the boundaries of geofences 130, 132 can be electronically drawn by electronically connecting a series of points and forming a perimeter by drawing electronic lines between adjacent points. Those skilled in the art will recognize that other methods of generating geofences can also be used.

At location "A", server 120 sends location requirements and corresponding data to electronic device 110. At location "B", electronic device 110 determines that the location of electronic device 110 is within the perimeter of geofence 130 and therefore handles any received data and informs server 120 of the action taken. By "handling" the data, electronic device 110 either accepts or defers acceptance of the data based on the characteristics of geofence 130. At location "C", electronic device 110 detects that the location of electronic device 110 is within the perimeter of geofence 132 and performs the same functions as were performed with respect to geofence 130 for data received while within Geofence 132 and informs server 120 accordingly. Electronic device 110 may also decide to discard, defer, or otherwise handle the data again for geofence 130. At location "D", electronic device 110 detects that the location of electronic device 110 is no longer in geofence 132 and may decide to discard, defer, or otherwise handle the data again for geofence 132.

In one embodiment, the first position is within geofence 130 so that the data is transmitted by server 120 only if electronic device 110 with within geofence 130 and defers transmitting the data if the second position is outside of geofence 130. In an alternative embodiment, the first position is outside of geofence 130 so that the data is transmitted by server 120 only if electronic device 110 is outside of geofence 130 and defers accepting the data if the second position is within geofence 130.

Electronic device 110 only transmits electronic information about the location of electronic device 110 to server 120 after the electronic device 110 has moved a predetermined distance after the most recent transmission of the location of electronic device 110 to server 120. By polling or otherwise determining the location of electronic device 110 and periodically informing server 120, system 100 can be optimized to reduce transmission load. Server 120 then verifies whether data destined for electronic device 110 may be sent based on the location of electronic device 110, possibly performing anti-mocking or anti-spoofing behavior, preventing an electronic device from seeming to be either within/outside a defined perimeter, when it is actually outside/within the perimeter. For example, if device 110 is known to be 10 miles from geofence 130 at a particular time, and it takes approximately 20 minutes to travel the distance between the known location and geofence 130, the system will not accept a perceived indication that device 110 has somehow arrived within the geofence 130 less than 5 minutes after the particular time. In such an instance, server 120 flags device 110 as a discrepancy for investigation by an administrator. The travel time can be accessed through commercially available GPS apps that estimate travel time between two locations.

Referring back to FIG. 1, when electronic device 110 is at location A, electronic device 110 provides its location to server 120 and therefore handles any received data and informs server 120 of the action taken. By "handling" the data, server 120 either transmits or defers transmission of the data based on the characteristics of geofence 130. At location "C", server 120 detects that the location of electronic device 110 is within the perimeter of Geofence 132 and performs the same functions as were performed with respect to Geofence 130 for data received while within Geofence 132. Server 120 may also decide to transmit, defer, or otherwise handle the data again for Geofence 130. At location "D", server 120 detects that the location of electronic device 110 is no longer in Geofence 132 and may decide to transmit, defer, or otherwise handle the data again for Geofence 132.

In one embodiment, the first position is within geofence 130 so that the data is accepted only if electronic device 110 is within geofence 130 and defers accepting the data if the second position is outside of geofence 130. By way of example only, geofence 130 can be a radius around a consumer retail location so that advertisements for the consumer retail location are only received by electronic device 110 when electronic device 110 is within the radius or within the retail location itself, prompting the holder of electronic device 110 to visit the consumer retail location.

In an alternative embodiment, the first position is outside of geofence 130 so that the data is accepted only if electronic device 110 is outside of geofence 130 and defers accepting the data if the second position is within geofence 130. By way of example only, geofence 130 can be a school, so that reception of electronic data by electronic device 110 is deferred until electronic device 110 leaves the school, preventing students from using their electronic devices while in school.

FIGS. 2A-2D and 3 provide flowcharts 200, 200A, respectively, showing an exemplary operation of system 100 incorporating these three implementation alternatives.

In step 202, a message is ready to be sent to device 110. If, however, in step 204, it is determined that the message does match an eligible electronic device 110, in step 210 the message is prepared to be sent to electronic device 110. Further, in step 206, if it is determined that the message does match a predetermined topic, in step 212 it is determined whether electronic device 110 is set up to receive messages for that particular topic. If the answer is no, the message is terminated. If the answer is yes, in step 210, the message is prepared to be sent to electronic device 110.

In step 214, the method of delivery is determined. Three primary implementation alternatives for operating the inventive system are provided, namely, device validation, server validation, and trusted client validation. Exemplary scenarios for using device validation, server validation, and trusted client validation can be as follows: if the time range is presently active or will be active in the next several (i.e. 5) minutes and there is no location validation, use device validation; is the electronic data is location sensitive, use server validation; if any other scenario, use trusted client validation, wherein electronic device 110 may downgrade to client validation to take advantage of favorable conditions (i.e., the presence of Wi-Fi). With the device validation method stating with step 216, a first reception location, such as a geofence 130, is electronically defined and provided within system 100. Electronic data is wirelessly transmitted from server 120 to electronic device 110. When using device validation (or client validation) in step 218, server 120 pushes data that electronic device 110 has been authorized to access and electronic device 110, through polling, geofences or other means, and verifies whether the data should be handled (yes) or deferred to a later time (no) in step 220.

The process of determining the answer to the question asked in step 220 is shown in flowchart 200A. In step 220A, it is determined whether the electronic data is enabled. If so, the process proceeds to step 220B, where it is determined whether the time within an acceptable time range for delivery of the electronic data is valid. If so, the process proceeds to step 220C, where it is determined whether the location of electronic device 110 passes the location conditions for displaying the electronic data (i.e., is the electronic device 110 within a specified geofence?). If so, the process proceeds to step 222 below. If the answer to the determination in any of steps 220A, 22B, 220C is no, the process proceeds to step 238, which is discussed in detail later herein. By way of example only, if a message is not enabled (or "deferred") in step 220A, the electronic message may still be sent to electronic device 110 but not displayed. If the message for whatever reason or event has no fixed date or is not known ahead of time (i.e. it is a rainy day, snow shuts down school, etc.), the electronic message may then be activated and displayed.

In step 222, electronic device 110 accepts and shows the electronic data only if electronic device 110 is in a first position relative to geofence 130 and defers acceptance of the electronic data only if the electronic device is in a second position relative to geofence 130.

In step 224, it is determined whether electronic device 110 has displayed the electronic data. Whether electronic device 110 accepts or defers accepting the data, electronic device 110 transmits a message to server 120 informing server 120 of the status of the electronic data. Optionally, electronic device 110 also transmits a reason to server 120 why the electronic data was accepted or deferred (e.g., inside or outside geofence 130).

In step 226, if the electronic data has not been displayed and after a predetermined period of time, it is decided whether to dismiss the electronic data. If not, the electronic data is transmitted via an alternative method For example, if electronic device 110 is a cell phone and the electronic data comprises a text message, in step 228, the alternative method can be to send an e-mail to an associate e-mail address. If, however, it is desired to dismiss the electronic data for a particular reasons, such as, for example, if the electronic data has been displayed or after a predetermined period of time, in step 230, the message is dismissed.

In step 232, it is determined whether to re-show the electronic data. If the decision is to not re-show the electronic data, in step 234, the electronic data is terminated. If, however, it is determined to re-show the electronic data, in step 236, it is determined when to re-show the electronic data. When the time to re-show the electronic data arrives, in step 222, the electronic data is re-shown and the process continues from step 222.

If, in response to the determination of whether to show the electronic data in step 222, the answer is no, in step 238 it is determined whether to archive the electronic data. The data can be archived at the server 120 and at electronic device 110 as well. If yes, then the electronic data is archived an in step 240, the transmittal is terminated. If, no, however, the process reverts back to step 220.

After step 214, if it is determined to use server validation in step 242, reception locations are determined and mapped in step 244. In an exemplary embodiment, the reception locations are geofences 130, 132. Electronic device 110 then determines its location and periodically transmits electronic information about the location of electronic device 110 to server 120 in step 246. In step 248, server 120 determines whether to transmit data to electronic device 110 only when electronic device 110 is in a first position relative to the reception locations or to defer transmitting data to electronic device 110 only when electronic device 110 is in a second position relative to the reception locations.

In step 250, if electronic device 110 is in the first position, the message data is sent. In step 252, if it is determined that the electronic data is not to be sent, it is determined whether to archive the electronic data. If yes, then the electronic data is archived an in step 254, the transmittal is terminated. If, no, however, in step 256, it is determined whether to downgrade the transmission protocol to trusted client validation in step 262 or to send polling hints to electronic device 110 in step 258.

Polling hints are suggestions by the server 120. For example, server 120 may suggest how often the app should request the location of electronic device 110, or how precise the results need to be. Since only the server 120 knows both the location of electronic device 110 and the reception location of electronic device 110 for server validation, only the server 120 can decide those matters. If it is determined to send polling hints, the process returns to step 246.

If it is determined to use trusted client validation in step 260, server 120 does not disclose data or information to device 110 but may disclose approximate location or other metadata in step 262. Electronic device 110 then stores the metadata and will poll or otherwise determine the location of electronic device 110 and will verify based on the location of electronic device 110 whether all of the electronic data should be shown by electronic device 110 in step 264. The metadata can include information about reception locations such that electronic device 110 is able to validate its own location without needing to contact server 120. Further, the metadata informs electronic device 110 that electronic data is at server 120 for transmission to electronic device 110. The size of the metadata is very small (preferably just a few bytes) in comparison to the size of the electronic data, so that minimal bandwidth and data usage is required to inform electronic device 110 that electronic data is available for transmission from server 120.

Similar to server validation, when using trusted client validation, reception locations are determined and mapped. In an exemplary embodiment, the reception locations are geofences 130, 132. Electronic device 110 then determines its location and transmits electronic information about the location of electronic device 110 to server 120. Server 120 transmits data to electronic device 110 only when electronic device 110 is in a first position relative to the reception locations. Server 120 defers transmitting data to electronic device 110 only when electronic device 110 is in a second position relative to the reception locations. This method requires that electronic device 110 be trusted but minimizes the data sent to electronic device 110, which is beneficial in some scenarios.

In one embodiment, the first position is within geofence 130 so that the data is transmitted by server 120 only if electronic device 110 with within geofence 130 and defers transmitting the data if the second position is outside of geofence 130. In an alternative embodiment, the first position is outside of geofence 130 so that the data is transmitted by server 120 only if electronic device 110 is outside of geofence 130 and defers accepting the data if the second position is within geofence 130.

Referring back to FIG. 1, when electronic device 110 is at location A, server 120 transmits metadata to electronic device 110, informing electronic device 110 that server 120 has electronic data that can be transmitted to electronic device 110, but does not yet transmit the actual electronic data. Electronic device 110 determines the location of electronic device 110 and transmits electronic information about the location of electronic device 110 from electronic device 110 to server 120.

If the electronic data is to be transmitted when electronic device 110 is within a geofence 130, 132, at locations "B" and "C", electronic device 110 determines that the location of electronic device 110 is within the perimeter of geofences 130, 132 and transmits that location to server 120 so that server 120 can send the electronic data to electronic device 110. At location "D", electronic device 110 transmits the location of electronic device 110 to server 120, which determines that electronic device 110 is no longer in geofence 132 such that server 120 transmits metadata, defers, or otherwise handles the data for electronic device 110.

Referring back to FIGS. 2 and 2A the determination of whether to show the electronic data in step 260 can be determined by the exemplary process of flowchart 200B. In step 264A, it is determined whether the electronic data is enabled. If so, the process proceeds to step 264B, where it is determined whether the time within an acceptable time range for delivery of the electronic data is valid. If so, the process proceeds to step 264C, where it is determined whether the location of electronic device 110 passes the location conditions for displaying the electronic data (i.e., is the electronic device 110 within a specified geofence?). If so, the process proceeds to step 266, wherein the full message electronic data is requested and, in step 222, the full message is displayed. If the answer to the determination in any of steps 264A, 264B, 264C is no, the process proceeds to step 268, in which it is determined whether to archive the message. If yes, then the electronic data is archived an in step 270, the transmittal is terminated. If, no, however, the process proceeds to step 272.

In step 272, it is determined whether to downgrade the transmission protocol to device validation. If yes, the process continues from step 218. If no, the process continues to step 264.

Additional features of system 100 can include receipt acknowledgement by the receiver, re-notification based on a specific time of day, and duration-based removal of the data transmission from the receiving device.

System 100 maintains a database of data transmissions as determined by group administrators. The database is a source for report generation and analysis by group administrators. The reporting system provides for various levels of authorization to access those reports.

The methods of device validation, server validation, and server entrusted validation can be combined into hybrid systems (i.e., downgrading in steps 256 or 272) in order to minimize or maximize a heuristic, such as network efficiency. For example, to minimize cellular data usage, device validation may be used when electronic device 110 has low-cost per megabyte data (such as Wi-Fi), but will fall back to trusted client validation when data costs more (such as 4G-LTE).

It will be further understood that various changes in the details, materials, and arrangements of the parts which have been described and illustrated in order to explain the nature of this invention may be made by those skilled in the art without departing from the scope of the invention as expressed in the following claims.

I claim:

1. A method for transmitting data comprising the steps of:
   (a) providing a first reception location;
   (b) transmitting electronic data from a server to an electronic device;
   (c) allowing the electronic device to accept the electronic data only if the electronic device is in a first position relative to the first reception location;
   (d) allowing the electronic device to defer acceptance of the electronic data only if the electronic device is in a second position relative to the first reception location; and
   receiving a message to the server from the electronic device informing the server of the status of the electronic data, wherein the first position is outside of the first reception location and the second position is inside the first reception location.

2. The method according to claim 1, wherein step (e) further comprises allowing the electronic device to transmit a reason to the server why the electronic data was accepted or deferred.

3. The method according to claim 1, wherein step (a) comprises defining a perimeter of the first reception location.

4. The method according to claim 1, further comprising the step of:
   (e) receiving a receipt acknowledgement transmitted by the electronic device to the server.

5. The method according to claim 1, further comprising the step of:
   (e) repeating steps (b)-(d) based on the time of day.

6. The method according to claim 1, further comprising the step of:

(e) providing duration-based removal of the data transmission from the electronic device.

7. A method for transmitting data comprising the steps of:
(a) providing a first reception location;
(b) transmitting electronic data from a server to an electronic device;
(c) allowing the electronic device to accept the electronic data only if the electronic device is in a first position relative to the first reception location;
(d) allowing the electronic device to defer acceptance of the electronic data only if the electronic device is in a second position relative to the first reception location, prior to step (c), the server receives a permission from the electronic device allowing the performance of step (d), wherein the first position is outside of the first reception location and the second position is inside the first reception location.

8. A method for transmitting data comprising the steps of:
(a) providing a first reception location;
(b) determining a location of an electronic device;
(c) receiving a transmission of electronic information about the location of the electronic device from the electronic device to a server;
(d) transmitting electronic data from the server to the electronic device only when step (c) indicates that the electronic device is in a first position relative to the first reception location;
(e) deferring transmitting the electronic data from the server to the electronic device only when step (c) indicates that the electronic device is in a second position relative to the first reception location; and
(f) repeating step (c) after the electronic device has moved a predetermine distance after performing step (c), wherein the first position is outside of the first reception location and the second position is inside the first reception location.

9. The method according to claim 8, further comprising the step of:
(g) repeating steps (c)-(e) until one of:
(g)(1) step (d) is performed; or
(g)(2) a predetermined amount of time has passed after first performing step (e).

10. A method for transmitting data comprising the steps of:
(a) providing a first reception location;
(b) transmitting metadata from a server to an electronic device;
(c) determining a location of the electronic device outside of the first reception location;
(d) receiving a transmission of electronic information about the location of the electronic device from the electronic device to the server;
(e) transmitting data other than the metadata from the server to the electronic device only when step (d) indicates that the electronic device is in a first position relative to the first reception location;
(f) recording a time between the performance of step (c) and step (e);
(g) determining travel time between the location of the electronic device in step (c) and the first reception location;
(h) generating a discrepancy if the time recorded in step (f) is less than the determined travel time in step (g); and
(i) deferring transmitting the electronic data from the server to the electronic device only when step (d) indicates that the electronic device is in a second position relative to the first reception location.

11. The method according to claim 10, wherein step (b) informs the electronic device that the server has the data.

12. The method according to claim 10, wherein the first position is outside of the first reception location and the second position is inside the first reception location.

13. The method according to claim 10, wherein the first position is inside of the first reception location and the second position is outside the first reception location.

* * * * *